(No Model.) 2 Sheets—Sheet 1.
E. F. MORSE.
VEHICLE GEAR AND SPRING.
No. 415,414. Patented Nov. 19, 1889.
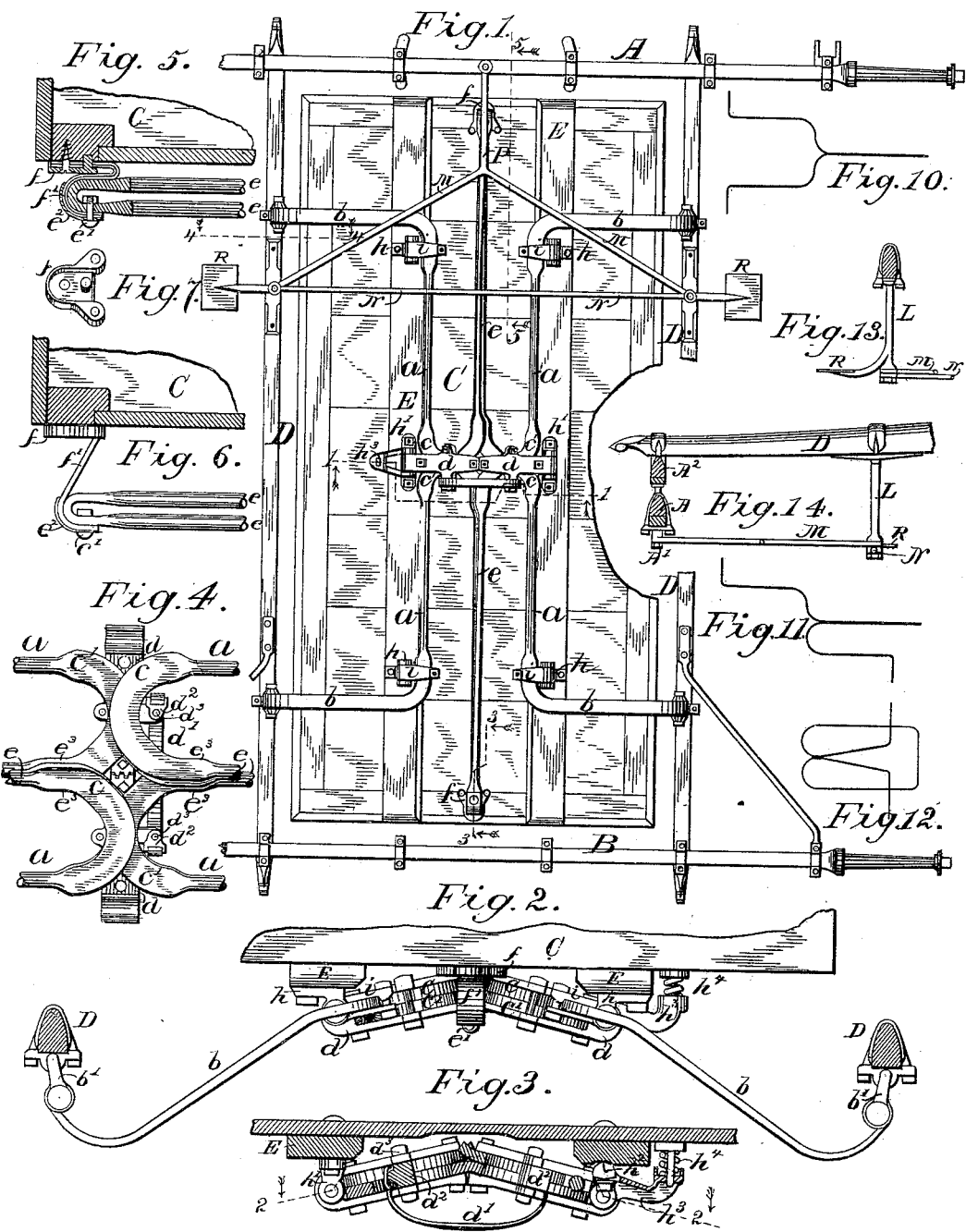
WITNESSES: 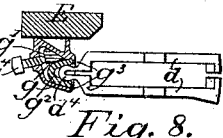
INVENTOR: 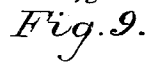

(No Model.)  E. F. MORSE.  2 Sheets—Sheet 2.
VEHICLE GEAR AND SPRING.

No. 415,414.  Patented Nov. 19, 1889.

WITNESSES:  
Sanford F. Goude  
Wm. L. Ostrom

INVENTOR:  
Everett F. Morse

UNITED STATES PATENT OFFICE.

EVERETT F. MORSE, OF ITHACA, NEW YORK.

VEHICLE GEAR AND SPRING.

SPECIFICATION forming part of Letters Patent No. 415,414, dated November 19, 1889.

Application filed September 16, 1887. Serial No. 249,857. (No model.)

*To all whom it may concern:*

Be it known that I, EVERETT F. MORSE, a citizen of the United States, residing at Ithaca, in the county of Tompkins and State of New York, have invented certain new and useful Improvements in Vehicle Springs and Gears, of which the following is a specification.

My invention relates to the springs and gears of vehicles, and has for its objects to provide a spring yielding large vertical flexibility combined with the requisite stability to prevent the body from rolling either endwise or sidewise to an objectionable extent, and, further, to provide an improved means for staying the front axle from the side bars as a base; and it consists of a novel arrangement of torsion-rods, rigidly-united supporting-arms, and peculiar connections between said rods, whereby the angular motion of any one of the supporting-arms due to the depression of the part of the body it supports is transmitted in part to each of the other supporting-arms, so as to depress the parts of the body they support, and of a novel arrangement of connections between the side bars and the lower journal on which the front axle turns, together with other details of construction, as will be hereinafter described.

Figure 15:
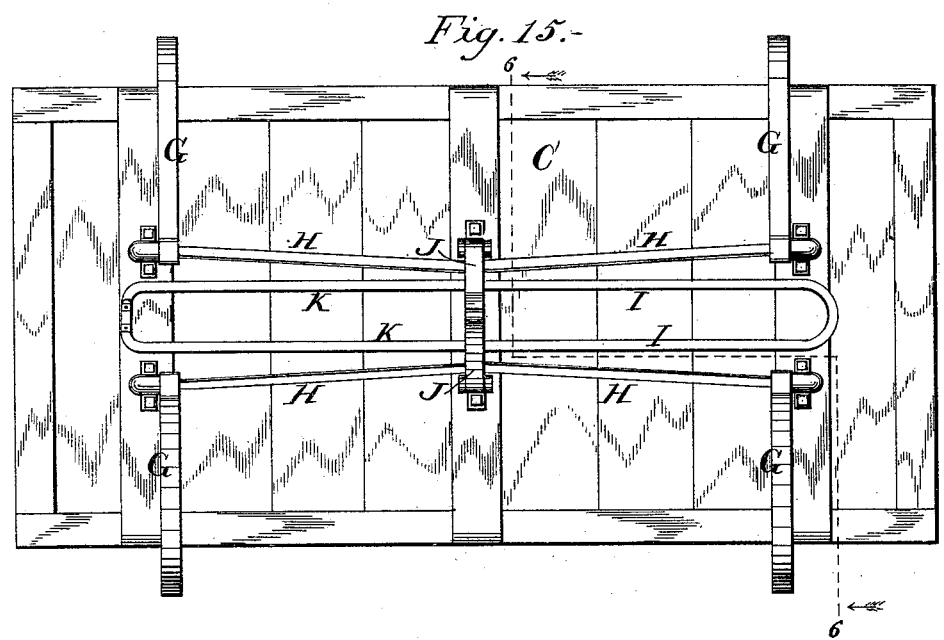
Figure 16:
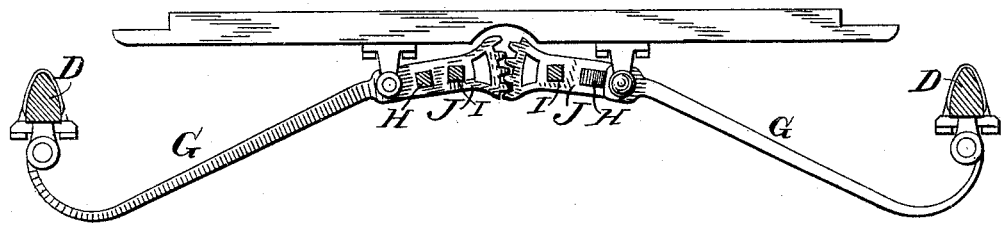

Figure 1 is a bottom view of a vehicle-gear with my improvements attached, but having certain well-known parts broken away. Fig. 2 is an end view of a part of the same. Fig. 3 is a vertical sectional view of the central part of my spring on the line 1 1 of Fig. 1. Fig. 4 is a sectional horizontal view of the same on line 2 2 of Fig. 3. Fig. 5 is a vertical sectional view of a part on line 3 3 of Fig. 1. Fig. 6 is an elevation of the same, but showing the positions of the parts when the spring is depressed. Figs. 7, 8, and 9 are detail views of attachments to my spring. Figs. 10, 11, and 12 are diagrams illustrating different ways of forming the elastic rods of my spring, while the spring still retains its essential features. Fig. 13 is a vertical view of the stop-arm and its attachments on line 4 4 of Fig. 1. Fig. 14 is a longitudinal section of my gear on line 5 5 of Fig. 1. Fig. 15 is a bottom view of my spring in its generic form, and Fig. 16 is a vertical section of the same on the line 6 6 of Fig. 15.

Throughout the several views similar letters refer to similar parts.

In the form which I deem best adapted to practical use, which is illustrated in Figs. 1 to 9, inclusive, my spring consists of two similarly-formed elastic rods having their opposite ends pivotally connected with the opposite side bars by the links $b'$ and their intermediate portions pivotally connected to the body-bottom by the hangers $h\,h'$, arranged on opposite sides of the longitudinal central line of the body. The terminal portions of these rods extend transversely of the gear and form the supporting-arms $b$ of the spring. At the butt-ends of these arms the rods are bent so as to extend longitudinally of the gear and toward the transverse central line of the body, thereby forming the side torsional branches $a\,a$ of the spring. At the ends of these branches the rods are again bent in a semicircular form toward the longitudinal central line of the body, along which they extend from the latter curves toward the opposite ends of the body, thus forming the central torsional branches $e\,e$, arranged one above the other. The rods have their central parts, which form the free ends of the central branches, bent back upon themselves, as shown in Figs. 5 and 6. The ends of the central branches, which are connected with the side branches, have their adjacent faces properly formed to act against each other as teeth of a spur-gear, as shown in Fig. 3. The rods thus formed are arranged so that the respective branches extend nearly or quite in the same straight lines, and the portions $c\,c'$, joining the central and side branches, lap onto each other about the width of the rods, the parts $c\,c'$ of one rod being arranged above and below, respectively, the corresponding parts of the other rod, as shown in Fig. 4, and the rods thus arranged are securely clamped together by clamps $d\,d$, which are pivotally connected to the body at their remote ends, thus supporting the central part of the spring, and have their adjacent ends curved, so as to roll against each other and act as segmental frictional gears. The frictional resistance of these gears can be increased by forming their faces into circumferential teeth and grooves, as shown in Fig. 4. The pressure of these frictional gear-sectors against each other may be obtained from several sources. The bend at the free or doubled ends of the central branches $e$ are made so that these branches normally form a horizontal V, thus causing the tooth-formed parts to lap by each other. When the clamps $d$ are applied, the central branches are sprung back to their working positions, and in their effort to regain their normal positions cause a constant pressure of the frictional sectors against each other; but as the strain which the central branches are thus subjected to reduces their supporting capacity as springs, it may be desirable to effect a part of the desired pressure by a spring $d'$, curved as shown, and having its ends adapted to bear against the pieces $d^2$, secured to the clamps $d$ by bolts $d^3$. When the spring is worked, the curved ends of pieces $d^2$ roll against the ends of the spring $d'$, thus forming an anti-friction joint. The central bearings are automatically kept free from slack or rattling by one of them being provided with a curved base $h^2$, which bears against the bar E, and a laterally-extending arm $h^3$, between the free end of which and the body is interposed the coiled spring $h^4$, the function of which is to constantly press the free end of arm $h^3$ downward and the axis of the hanger toward the opposite central hanger, which is rigidly attached to the body-bottom.

Although the central part of my spring may be pivotally connected to the body in the manner shown in Figs. 1 to 3, inclusive, the connection which I deem best adapted to this part of the spring is shown in section by Fig. 8, which will be described and claimed in my application filed May 6, 1889, Serial No. 309,783.

The springs are connected to the hangers $h$ by the clamps $i$, provided with an eye $i'$, adapted to be received between the ears of the hanger $h$, and from which extend two nearly or quite parallel arms $n$ $n$. The distance between the arms is somewhat reduced at their attached ends, preferably by a filling $i^2$ on the lower arm, and one arm (preferably the upper) is provided at its free end with an inwardly-projecting inclined flange $i^3$. The clamp thus formed is securely clamped onto the spring-bar by a single bolt connecting the free ends of the arms. The flange $i^3$ acts to force the spring-bar against the filling $i^2$, and thus causes the clamp to tightly grasp both edges of the spring-bar. The free ends of the central branches $e$ $e$ are connected to the opposite ends of the body by a flexible connection $f'$, preferably of leather, having one end attached to the under side of the rods by bolt $e'$ and plate $e^2$, one end of which is curved about the end of the rods to hold the strap $f'$ in position, as shown in Figs. 5 and 6. The upper end of strap $f'$ is secured to the body by means of clip $f$. The strap $f'$, by extending from the clip $f$ toward the center of the body, is made to fold up between the body and branch $e$ when the spring is not depressed, as shown in Fig. 5.

The elastic rods forming the springs have a circular cross-section in the portions forming the central and side torsional branches, which are subjected to torsional strains; but the portions forming the arms and connections between the torsional branches, being subjected to flexional strains, have rectangular cross-sections. By thus adapting the cross-sections to the strains they have to bear a considerable reduction in the weight of the spring is effected.

As the peculiar construction of some of the parts of my spring has somewhat disguised the essential elements of mechanism utilized in its construction, I have shown in Figs. 15 and 16 a spring embodying substantially the same elements of mechanism, but in more typical forms. By referring to these figures it will be seen that my spring consists of torsion-rods H, pivotally connected to the bottom of the body at opposite sides of its central line, supporting-arms G, rigidly attached to the ends of the rods H, toothed sectors J J, rigidly attached to rods H between the arms G and adjusted to engage with each other under the middle of the body, and a yielding resistance to the angular motion of rods H, provided by rods K K, connecting sectors J J with the end of the body, and the U-shaped rods I I, connecting the sectors J J with each other. It will be observed that the spring shown in Sheet 1 is the same mechanically as the one just described, the former differing only by the mechanical elements composing it being given different forms.

My device for restraining the axle from tipping either forward or backward relates to certain improvements in the device for a similar purpose described in Letters Patent granted me June 5, 1888, No. 383,974, and consists of arms L, which have their upper ends rigidly attached to the side bars D, a horizontal truss having its members M and N converging toward its ends, which are securely attached to the lower ends of said arms, and a rod P, connecting the central part of said truss to the lower journal, on which the front axle turns. In the patent above referred to the truss is shown to be connected directly with the lower journal A'. By making this connection through the rod P an improvement in the appearance of the gear is effected and the device is better adapted to some forms of vehicles.

The operation of my spring is as follows: The supporting-arms $b$ in supporting the body as described subject themselves to bending moments and the torsion branches to twisting moments. In yielding to these moments the arms $b$ and branches $a$ act as independent springs, allowing the respective parts of the body they support to be depressed independently to the extent of the yielding capacity of the arms and side branches; but by virtue of the central parts of the spring being arranged to act as spur-gears the central branches in yielding to the twisting moments are restrained to add an equal amount of angular motion to each of the side branches, and consequently add equal depressions to all parts of the body, thus much increasing the flexibility of the spring to even depression relatively to its flexibility to rolling action or uneven depression. When the parallel arms $b$, supporting one side of the body, are together subjected to moments of different magnitude from the arms supporting the opposite side, the gear-sector of the side of greater moment acts as the driver. Consequently when the effect of uneven roads or other causes is to shift the side of greater moment back and forth from one side of the body to the other the gear-sectors act alternately as drivers. To insure a quiet change of drivers is one of the functions of the frictional gear-sectors, which by interposing a frictional resistance prevents the independent motion of the gears through the side clearance of the teeth, except when the driving force between the gears becomes unusually great, and they then cause this very limited independent motion to take place slowly, and consequently quietly. This change of drivers also causes a reversal of direction of pressure in the central bearings. It is therefore desirable that these bearings should be kept constantly tight. This end is attained in the manner hereinbefore described.

Among the modifications of which my spring is susceptible three are shown in Figs. 10, 11, and 12. In Fig. 10 the central and side branches of the same rod extend under opposite ends of the body, the parts of the rods connecting the central and side branches being bent in an ogee form instead of in a semicircular form. In Fig. 11 the supporting-arms of the same rod are arranged under diagonally-opposite corners of the body, and in Fig. 12 the supporting-arms are attached to the central branches, and the side branches are made to fill the function of the central branches of the former constructions. In all these forms the operating mechanism is substantially the same.

What I claim as new, and desire to secure by Letters Patent, is—

1. A vehicle-spring consisting of the combination of two pairs of similarly-extending supporting-arms, said pairs being relatively arranged to extend in opposite directions under and pivotally connected to the opposite sides of the body near its ends, two gear-sectors arranged to engage with each other under the central part of the body, rods rigidly united to and forming torsional links between the gear-sectors and similarly-extending arms arranged, respectively, under the same sides of the body, and means for providing a yielding resistance to the angular motion of said rods and gear-sectors, substantially as described.

2. A vehicle-spring consisting of the combination of two pairs of similarly-extending supporting-arms, said pairs being relatively arranged to extend in opposite directions under and pivotally connected to the opposite sides of the body near its ends, torsion-rods rigidily united to and connecting said similarly-extending arms, means for restraining said torsion-rods to equal angular motions between said similarly-extending arms, and a U-shaped rod having its branches extending nearly or quite parallel to said torsion-rods, rigidly with which its ends are respectively connected at a point near the middle of the body, substantially as described.

3. A vehicle-spring consisting of the combination of two pairs of similarly-extending supporting-arms, said pairs being relatively arranged to extend in opposite directions under and pivotally connected to the opposite sides of the body near its ends, two gear-sectors arranged to engage with each other under the central part of the body, rods rigidly united to and forming torsional links between the gear-sectors, and similarly-extending arms arranged, respectively, under the same sides of the body, and a U-shaped rod having its ends respectively attached to said gear-sectors, substantially as described.

4. A vehicle-spring pivotally connected to the opposite sides of the body-bottom, and consisting of supporting-arms and elastic rods, said rods being bent to form the side torsion branches $a$, the central torsion branches $e$, and connections $c\ c'$ between said branches, and arranged so that the central and adjacent terminal parts of connections $c\ c'$ overlap each other, said central parts being securely clamped together and said adjacent terminal parts adapted to act against each other as teeth of spur-gears, substantially as described.

5. A vehicle-spring pivotally connected to the opposite sides of the body-bottom, and consisting of supporting-arms and rigidly-united elastic rods bent so as to form the side torsion branches $a$, the central torsional branches $e$, and connections $c\ c'$ between said branches, and arranged so that the central parts of connections $c\ c'$ overlap each other one above the other and are securely clamped together, substantially as described.

6. A vehicle-spring pivotally connected to the opposite sides of the body-bottom, and consisting of supporting-arms and rigidly-united elastic rods bent so as to form the side torsion branches $a$, the central torsion branches $e$, and the connections $c\ c'$ between said side and central branches, and arranged so that the central and adjacent terminal parts of connections $c\ c'$ overlap each other one above the other, said central parts being securely clamped together by clamps pivotally connected to the body at their remote ends, substantially as described.

7. In a vehicle-spring, the combination of two spur-gear sectors hung to the body on opposite sides of its central line and arranged to mesh one with the other, and two frictional gear-sectors similarly hung, arranged and adapted to co-operate with said spur-gear sectors, said sectors being connected with and adapted to transmit angular motion between the oppositely-extending supporting-arms of the spring, substantially as described.

8. In a vehicle-spring, the combination of two frictional gear-sectors hung to the body on opposite sides of its central line and arranged to work one against the other, and a supplementary spring having upwardly-extending arms adapted to bear against and press said sectors together, said sectors being respectively connected with and adapted to transmit motion between the oppositely-extending arms of the spring, substantially as described.

9. In a vehicle-spring, the combination of two nearly or quite parallel elastic rods having oppositely-extending supporting-arms rigidly united thereto and pivotally connected to a vehicle-body on opposite sides of its central line, a U-shaped rod having its branches extending nearly or quite parallel to and its ends rigidly connected with said elastic rods, and a flexible connection between the body and the free or doubled end of said U-shaped rod, substantially as described.

10. A vehicle-spring bearing $h'$, flexibly connected to the vehicle-body and having a laterally-extending arm $h^3$, in combination with an expansive spring $h^4$, interposed between the body and free end of said arm, substantially as and for the purpose described.

11. As a means for pivotally connecting a vehicle-spring with the body, a clamp consisting of a continuous piece of metal suitably formed to act as one part of a hinged joint and provided with two nearly or quite parallel arms adapted to extend on opposite sides of the spring-bar, and means for drawing the free ends of said arms together, in combination with a hanger pivotally connected with said clamp and attached to the body, substantially as described.

12. As a means for pivotally connecting a vehicle-spring with the body, a clamp consisting of a continuous piece of metal suitably formed to act as one part of a hinged joint and provided with two nearly or quite parallel arms adapted to extend on opposite sides of the spring-rod, one or both of said arms having an inwardly-projecting inclined flange $i^2$, and means for drawing the free ends of said arms together, in combination with a hanger pivotally connected to said clamp and attached to the body, substantially as described.

13. The combination, with the side bars and axles of a side-bar wagon, of two vertical arms having their upper ends securely attached to said side bars, a horizontal truss consisting of two rods having their opposite terminal portions converging toward and their ends securely attached to said arms, and a rod or bar connecting the central part of said truss with the lower journal on which the front axle turns, substantially as described.

14. The combination, with the side bars and axles of a side-bar wagon, of two vertical arms having their upper ends securely attached to said side bars and steps attached to their lower ends, rod M, having its opposite ends securely attached to said arms, and rod P, connecting the central part of rod M with the lower journal on which the front axle turns, substantially as described.

15. The combination, with the side bars and axles of a side-bar wagon, of two arms having their upper ends securely attached to said side bars and steps affixed to their lower ends, a horizontal truss consisting of two rods having their opposite terminal portions converging toward and their ends securely attached to said arms, and a rod or bar connecting the central part of said truss with the lower journal on which the front axle turns, substantially as described.

EVERETT F. MORSE.

Witnesses:
SANFORD C. CONDE,
WM. L. OSTROM.